(No Model.)
S. M. SELLERS & L. C. GUTTERY.
HARVESTER TRUCK.
No. 542,067.  Patented July 2, 1895.
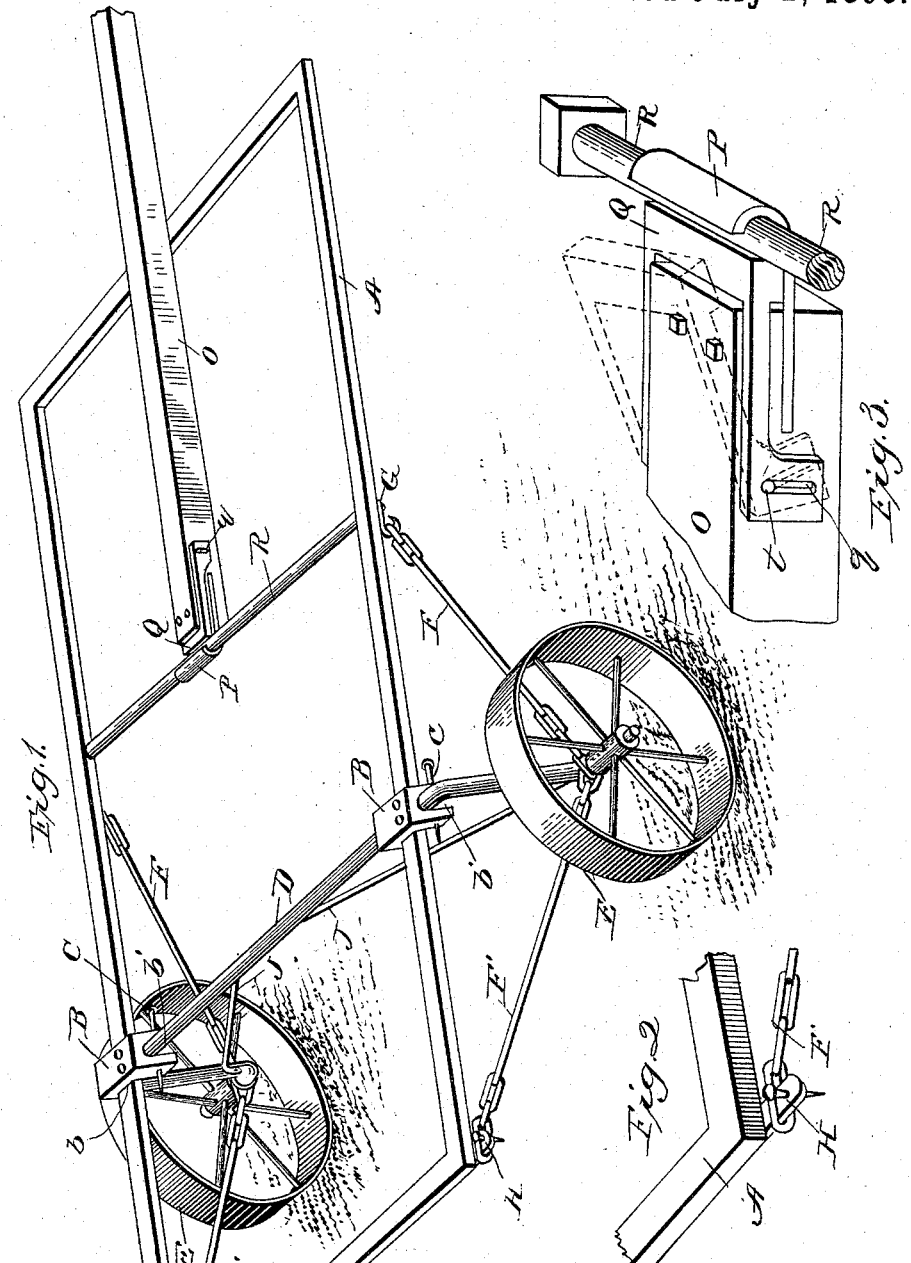

UNITED STATES PATENT OFFICE.

STANLEY M. SELLERS AND LEWIS C. GUTTERY, OF LEBANON, OHIO.

HARVESTER-TRUCK.

SPECIFICATION forming part of Letters Patent No. 542,067, dated July 2, 1895.

Application filed December 28, 1894. Serial No. 533,197. (No model.)

*To all whom it may concern:*

Be it known that we, STANLEY M. SELLERS and LEWIS C. GUTTERY, citizens of the United States, residing at Lebanon, in the county of Warren and State of Ohio, have invented certain new and useful Improvements in Trucks for Grain-Harvesters; and we do declare the following to be a full, clear, and exact description of the invention, such as will enable others skilled in the art to which it appertains to make and use the same, reference being had to the accompanying drawings, and to the letters of reference marked thereon, which form a part of this specification.

This improvement relates to trucks and carriages of grain-harvesters and the transportation thereof from place to place, and it has for its object the provision of a suitable truck that can be easily mounted for transportation.

The further object of this invention is the provision of a novel tongue attachment consisting of a hook for attaching a tongue to a truck or carriage and a clamp for holding the said hook to its proper place for securely holding the tongue to the truck.

The invention further consists in the novel construction and arrangement of the parts hereinafter described, illustrated in the drawings, and more particularly pointed out in the claims hereunto appended.

In the drawings, Figure 1 is a perspective view of the truck complete. Fig. 2 is a detail view of the rear end of the truck, showing the manner of attaching the rear stay chains or rods. Fig. 3 is a detail view of the tongue-attaching device, shown in clamped position in full lines and the clamping portion raised in dotted lines.

Similar letters indicate corresponding parts in all the figures.

Referring to the drawings by letters, A A represent the frame of the harvester, which is constructed as usual, and is adapted to have at one end thereof the grain-wheel and at the other end thereof the master-wheel. At suitable points on the frame, as near the center of gravity of the harvester as is practical, are secured suitable axle bearing-blocks B B, as shown. These blocks B B are provided in their under surfaces with grooves or channels $b\ b'$. One of the said grooves or channels $b$ is made to fit upon the side of the frame and the other groove or channel $b'$ is adapted to receive and hold the axle D, which is held therein by pins C, as shown. The outer ends of the axle are bent to shape, as shown in Fig. 1, and have upon the spindles thereof the wheels E E.

F F' are stay chains or rods secured to the axle just to the rear of the spindle. The chains or rods F are the front stay chains or rods and are secured upon the hooks G, and the chains or rods F' are secured upon projections H upon the rear of the frame and are held thereon by means of suitable pins, as shown. These stay chains or rods are for the purpose of holding the axle D in the proper position and preventing it turning down when the weight of the harvester is upon it.

J J are brace rods secured upon the axle D to prevent the spreading of the shaped ends thereof.

R is a rod placed in the frame A at any suitable point, to which the tongue of the truck is to be secured.

O is the tongue of the truck, and P is a suitable hook-shaped bracket secured in the rear end thereof, as shown.

Q is a clevis-shaped bracket having its head or clamping end made large and heavy and is adapted to serve as a clamp for the purpose of holding the said hook P upon the rod R, whereby the said tongue is securely fastened to the truck. In the forked ends of the bracket Q are suitable openings or slots $q$, through which is placed a pin or bolt $t$ for the purpose of hinging the said bracket to the tongue.

To adjust this truck for moving, the end of the harvester at which the grain-wheel is located is raised, this being easily done, as the harvester is made, as nearly as possible, to balance on the master-wheel thereof. The axle D is then placed in the proper channels or grooves in the blocks and secured therein, and the stay chains or rods are attached to the frame in their proper positions. The tongue is then attached to the truck in the manner described, when the harvester is ready to be moved.

Having described our invention, what we claim is—

1. In a truck for harvesters the combination of the frame A, having the grooved axle blocks B secured thereon near one end thereof, with a removable axle D bent to shape and provided with wheels, the brace rods J, J, secured on said axle, and the adjusting stay-chains F and F', as set forth.

2. In a truck for harvesters the combination of the frame A, the axle blocks B having cross-grooves therein, and rigidly secured to the said frame A, with a removable axle D bent to shape resting in grooves in said blocks and provided with wheels, means for holding said axle in said block, brace rods J, J, secured to said axle, the adjusting stay-chains F secured at one end to the axle at the spindle and at the other to the frame A at a point forward of the axle, and the adjusting stay-chains F' secured at one end to said axle at the spindle and at the other at a point to the rear of said axle, as set forth.

3. In a truck for harvesters the combination of the frame A and an axle bent to shape secured loosely thereto, with adjusting stay chains F and F', adapted to be set to hold the truck at any desired height between the ground and the top of the arch formed by said axle, as set forth.

4. In a truck for harvesters the combination of a rod R secured in the frame of the truck, with a tongue, a hook in the rear end thereof, a clevis-shaped bracket Q pivoted near the rear end of said tongue and independent of the hook, having its forward end enlarged to bear against the rod R, and the slots $q$ in the legs of the clevis-shaped bracket Q, as set forth.

In testimony whereof we affix our signatures in presence of two witnesses.

STANLEY M. SELLERS.
LEWIS C. GUTTERY.

Witnesses:
FRANK A. BONE,
M. E. GUSTIN.